(12) United States Patent  (10) Patent No.: US 8,441,737 B2
Buch et al.  (45) Date of Patent: May 14, 2013

(54) VARIABLE FOCUS LENS AND SPECTACLES

(75) Inventors: Justin Buch, Godalming (GB); William Johnson, Oxford (GB); Miranda Newbery, Sandy (GB); Andrew Roberston, Oxford (GB); Richard Taylor, Oxford (GB); Jonathan White, Kyoto (JP)

(73) Assignee: Adlens, Ltd., Oxford (GB)

( * ) Notice: Subject to any disclaimer, the term of this patent is extended or adjusted under 35 U.S.C. 154(b) by 123 days.

(21) Appl. No.: 12/937,136

(22) PCT Filed: Apr. 8, 2009

(86) PCT No.: PCT/GB2009/000923
§ 371 (c)(1),
(2), (4) Date: Mar. 7, 2011

(87) PCT Pub. No.: WO2009/125184
PCT Pub. Date: Oct. 15, 2009

(65) Prior Publication Data
US 2011/0261466 A1   Oct. 27, 2011

(30) Foreign Application Priority Data
Apr. 10, 2008 (GB) .................................. 0806561.7

(51) Int. Cl.
G02B 3/12 (2006.01)
(52) U.S. Cl.
USPC .......................................................... 359/665
(58) Field of Classification Search ........... 359/665–667
See application file for complete search history.

(56) References Cited

U.S. PATENT DOCUMENTS

| 504,890 A | 9/1893 | Ohmart |
| 1,269,422 A | 6/1918 | Gordon |
| 2,576,581 A | 11/1951 | Edwards |
| 3,161,718 A | 12/1964 | De Luca |

(Continued)

FOREIGN PATENT DOCUMENTS

| JP | 58-117519 | 7/1983 |
| WO | 96/38744 | 12/1996 |

(Continued)

OTHER PUBLICATIONS

Marks et al. "Adjustable Adaptive Compact Fluidic Phoropter With No Mechanical Translation of Lenses." Optics Letts. 35.5(2010):1-3.

(Continued)

*Primary Examiner* — Darryl J Collins
(74) *Attorney, Agent, or Firm* — Mintz Levin Cohn Ferris Glovsky and Popeo, P.C.

(57) ABSTRACT

The invention provides a variable focus lens formed from a ring with a front surface and a rear surface, a flexible membrane is attached to a radially inner part of the front surface, and a front cover is attached to a radially outer part of the front surface, a rear cover is provided on the rear surface of the ring, preferably integral with the ring, so that a variable volume cavity is defined between the flexible membrane, the ring and the rear cover, second flexible membrane can be provided between the ring and the rear cover, where the invention also provides a method of filling a variable focus lens, and an adjustment mechanism for varying the focus of the lens.

15 Claims, 11 Drawing Sheets

U.S. PATENT DOCUMENTS

| | | | |
|---|---|---|---|
| 3,598,479 A | 8/1971 | Wright | |
| 4,261,655 A | 4/1981 | Honigsbaum | |
| 4,403,840 A | 9/1983 | Okun | |
| 4,466,706 A | 8/1984 | Lamothe, II | |
| 4,913,536 A | 4/1990 | Barnea | |
| 5,138,494 A | 8/1992 | Kurtin | |
| 5,182,585 A | 1/1993 | Stoner | |
| 5,233,470 A * | 8/1993 | Wu | 359/666 |
| 5,371,629 A | 12/1994 | Kurtin et al. | |
| 5,463,223 A | 10/1995 | Wong et al. | |
| 5,526,067 A | 6/1996 | Cronin et al. | |
| 5,574,598 A | 11/1996 | Koumura et al. | |
| 5,668,620 A | 9/1997 | Kurtin et al. | |
| 5,684,637 A | 11/1997 | Floyd | |
| 5,956,183 A | 9/1999 | Epstein et al. | |
| 5,999,328 A | 12/1999 | Kurtin et al. | |
| 6,040,947 A | 3/2000 | Kurtin et al. | |
| 6,069,742 A | 5/2000 | Silver | |
| 6,188,525 B1 | 2/2001 | Silver | |
| 6,188,526 B1 | 2/2001 | Sasaya et al. | |
| 6,618,208 B1 | 9/2003 | Silver | |
| 6,715,876 B2 | 4/2004 | Floyd | |
| 7,256,943 B1 | 8/2007 | Kobrin et al. | |
| 7,359,124 B1 | 4/2008 | Fang et al. | |
| 7,440,193 B2 | 10/2008 | Gunasekaran et al. | |
| 7,453,646 B2 | 11/2008 | Lo | |
| 7,613,098 B2 | 11/2009 | Katsuma et al. | |
| 7,619,204 B2 | 11/2009 | Vinogradov | |
| 7,646,544 B2 | 1/2010 | Batchko et al. | |
| 7,697,214 B2 | 4/2010 | Batchko et al. | |
| 7,725,016 B2 | 5/2010 | Lee et al. | |
| 7,755,840 B2 | 7/2010 | Batchko et al. | |
| 7,866,816 B2 | 1/2011 | Kurtin | |
| 7,948,683 B2 | 5/2011 | Batchko et al. | |
| 7,986,464 B2 | 7/2011 | Chen et al. | |
| 8,002,403 B2 * | 8/2011 | Silver et al. | 351/110 |
| 8,018,658 B2 | 9/2011 | Lo | |
| 8,064,142 B2 | 11/2011 | Batchko et al. | |
| 2003/0095336 A1 | 5/2003 | Floyd | |
| 2004/0001180 A1 | 1/2004 | Epstein | |
| 2005/0218231 A1 | 10/2005 | Massieu | |
| 2006/0077562 A1 | 4/2006 | Silver | |
| 2006/0250699 A1 | 11/2006 | Silver | |
| 2007/0069041 A1 | 3/2007 | Quinones et al. | |
| 2008/0007689 A1 | 1/2008 | Silver | |
| 2008/0008600 A1 | 1/2008 | Silver | |
| 2008/0084532 A1 * | 4/2008 | Kurtin | 351/57 |
| 2011/0149406 A1 * | 6/2011 | Tsuji et al. | 359/665 |

FOREIGN PATENT DOCUMENTS

| | | |
|---|---|---|
| WO | 02/063353 A2 | 8/2002 |
| WO | 2007/049058 A2 | 5/2007 |
| WO | 2008/050114 A1 | 5/2008 |

OTHER PUBLICATIONS

Marks et al. "Adjustable Fluidic Lenses for Ophthalmic Corrections." *Optics Letts*. 34.4(2009):515-517.

Marks et al. "Astigmatism and Defocus Wavefront Correction Via Zernike Modes Produced With Fluidic Lenses." *Appl. Optics*. 48.19(2009):3580-3587.

Valley et al. "Adjustable Hybrid Diffractive/Refractive Achromatic Lens." *Optics Express*. 19.8(2011):7468-7478.

International Search Report PCT/GB2009/000923: Dated Dec. 9, 2009.

* cited by examiner

VARIABLE FOCUS LENS AND SPECTACLES

TECHNICAL FIELD

The invention relates to a variable focus lens, and to spectacles using the variable focus lens.

BACKGROUND

Fluid-filled variable focus lenses are well known. They normally consist of a liquid-filled chamber, at least one face of which is formed by a transparent flexible membrane. As liquid is introduced into or removed from the chamber, the flexible membrane is deformed, and its curvature accordingly changes. This change in curvature leads to a change in the optical characteristics and power of the lens. The power of the lens can thus be varied simply by varying the amount of liquid in the chamber.

One type of prior art variable focus lens is disclosed, for example, in WO 96/38744. In this document, the amount of fluid in the lens is adjusted by inserting a syringe through a bung, and using the syringe to add or withdraw fluid. If this lens is to be used in spectacles, the spectacle frames for the lenses must allow the lens to be accessed by the syringe, and it will be appreciated that use of this lens can be rather inconvenient in some circumstances.

For variable focus lenses for use in some types of spectacles, for example reading glasses, the required range of correction is quite small, and correction can be achieved across the entire range using a relatively small amount of liquid. This small amount of liquid can be stored in a relatively small reservoir.

According to one proposal, the lens can be formed from a ring to which a flexible membrane is attached to form one wall of a liquid filled cavity, and the reservoir can be provided in the interior of a hollow extension integral to the ring. As the reservoir is then integral to the ring, there is no need to attach or detach syringes or the like to allow adjustment of the lens. Further, there is no need to provide a separate duct connecting the reservoir with the lens cavity; in the past, such separate ducts have been prone to damage, and have been capable of interfering with the folding of the spectacles.

The volume of the reservoir can be varied, for example by forming the reservoir as a cylinder and moving a piston in the cylinder. It has been proposed to provide control means in the form of a handwheel operatively connected to the piston, such that rotational movement of the handwheel causes translational movement of the piston and thus causes the optical characteristics of the lens to vary.

BRIEF DESCRIPTION

According to a first aspect of the present invention, there is provided a variable focus lens, comprising: a ring with a front surface and a rear surface, wherein the front surface has a radially inner part and a radially outer part; a flexible membrane attached to the radially inner part of the front surface; a front cover, of larger radius than the flexible membrane, attached to the radially outer part of the front surface; and a rear cover on the rear surface of the ring, such that a variable volume cavity is defined between the flexible membrane, the ring and the rear cover.

It is also possible to insert a second flexible membrane between the ring and rear cover, and if this is done, it is preferable for the rear surface of the ring to have a similar structure to that of the front surface. Thus, according to a second aspect of the present invention, there is provided a variable focus lens, comprising: a ring with a front surface and a rear surface, wherein the front surface and the rear surface both have a radially inner part and a radially outer part; a first flexible membrane attached to the radially inner part of the front surface; a front cover, of larger radius than the first flexible membrane, attached to the radially outer part of the front surface; a second flexible membrane attached to the radially inner part of the rear surface; and a rear cover, of larger radius than the second flexible membrane, attached to the radially outer part of the rear surface, such that a variable volume cavity is defined between the flexible membranes and the ring.

It will be appreciated that the radially inner part and the radially outer part of the front surface (and, if appropriate, rear surface) of the ring can take a large number of different forms. In one presently preferred form, the radially inner part projects axially beyond the radially outer part, with the radially inner part and the radially outer part preferably being separated by a groove. As the radially inner part projects beyond the radially outer part, a step is formed in the outer profile of the ring.

It is further preferred for the front cover (and, if appropriate, the rear cover) to be formed with an annular projection that fits into the step of the profile of the ring. This construction allows a stronger joint between the cover and the ring.

It is also possible for the radially inner part and the radially outer part to have the same axial projection and be separated by a groove.

The cover can be attached to the ring by adhesive. However, it is also possible to use laser or ultrasonic welding to attach the cover to the ring. These methods may be preferred, as they avoid the need for a separate step of providing adhesive, and can increase the production rate as they do away with the need to allow the adhesive to cure.

According to a third aspect of the present invention, there is provided a method of filling a variable volume cavity of a variable focus lens with liquid, wherein the lens includes an integral hollow extension with an internal cavity that communicates with the variable volume cavity via an opening in the side wall of the variable volume cavity; comprising the steps of: arranging the lens such that its optical axis is horizontal, and the opening in the side wall of the variable volume cavity is at the top of the lens; introducing liquid into the variable volume cavity through the internal cavity of the integral extension such that air in the cavity is displaced and escapes through the internal cavity of the integral extension; continuing the previous step until the variable volume cavity is entirely filled with liquid, and the internal cavity of the integral extension is partly filled with liquid; rotating the lens around its optical axis until the axis of the internal cavity of the integral extension is vertical; introducing more liquid into the internal cavity of the integral extension until a positive meniscus is formed at the mouth of the internal cavity; and inserting a piston into the internal cavity of the integral extension to seal it.

It has been found that this method avoids introducing air bubbles into the lens during filling, and also allows all of the air in the variable volume cavity to escape before the lens is sealed.

According to a still further aspect of the invention, there is provided a variable focus lens comprising a ring with a front surface and a rear surface, a flexible membrane and a front cover attached to the front surface, and a rear cover on the rear surface of the ring, such that a variable volume cavity is defined between the flexible membrane, the ring and the rear cover, wherein the ring is provided with a integral hollow extension, the hollow interior of said extension communicating with said cavity, and forming a liquid reservoir for the variable focus lens when the variable volume cavity is filled with liquid; the lens being further provided with an adjustment mechanism on the integral hollow extension, the adjustment mechanism comprising: a piston arranged to move along the axis of the reservoir, to move liquid into or out of the variable volume cavity; means for holding the piston in the reservoir and preventing it from being withdrawn; and an adjuster coupled to the piston, such that rotation of the adjuster causes the piston to move along the axis of the reservoir.

Such an adjustment mechanism is acceptable to users, and allows simple adjustment of the volume of the cavity and thus of the power of the lens.

Preferably, means are provided to prevent the piston from rotating in the reservoir. This reduces the risk of the seal between the piston and the inside of the reservoir being degraded, which is particularly important as this could lead to leakage of the liquid.

In a preferred form, the piston has a shaft with a non-circular cross-section, and said adjustment mechanism additionally comprises a keyway to prevent the piston from rotating in the reservoir.

It is further preferred for the piston shaft to have an external screw thread which engages in a bore in the adjuster with an internal screw thread. This provides a particularly simple and robust mechanism for converting the rotational movement of the adjuster into translational movement of the piston.

Preferably, a retainer serves to hold the keyway and the adjuster in place on the extension. This simplifies the assembly of the adjustment mechanism.

A cosmetic knob may be provided on said adjuster to improve its appearance. If such a knob is provided, then it is preferred for a clutch mechanism to be disposed between the adjuster and the knob, to prevent damage to the mechanism from overtightening.

BRIEF DESCRIPTION OF THE DRAWINGS

Preferred embodiments of the invention will now be described by way of example only and with reference to the accompanying Figures, in which.

DETAILED DESCRIPTION

Figure 1:
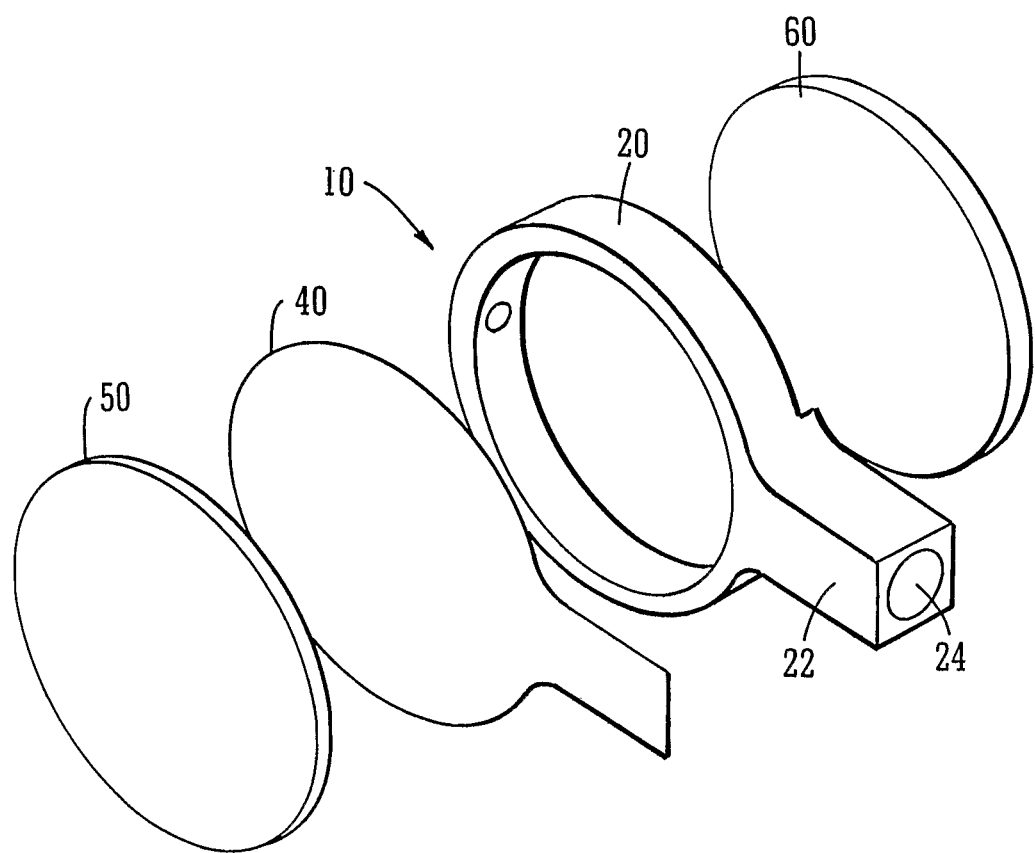
FIG. 1 is an exploded view of an earlier proposed form of variable focus lens.

FIG. 1 shows an earlier proposed lens 10 with an integral reservoir. The lens is formed from a plastic ring 20, which has an integral extension 22 with a hollow bore 24 therein. A rear cover 60 is attached to the rear of the ring 20, and a flexible membrane 40 is attached to the front of the ring. The ring 20, the rear cover 60 and the flexible membrane 40 between them form a cavity which is filled with liquid; further liquid can be introduced into and removed from the cavity to deform the flexible membrane and thus adjust the power of the lens. A front cover 50 is attached to the flexible membrane for protection.

The hollow bore 24 of the extension 22 serves as a reservoir, and contains a small amount of liquid which can be used to vary the power of the lens. A piston in the bore can be moved toward and away from the ring, to move liquid into and out of the cavity and thus deform the flexible membrane.

In order to reduce the amount of fluid required for correction, the front and back covers can be formed as lenses, whose combined optical powers are such that the total volume of liquid needed to change the power of the lens over the desired range is reduced. This allows the lens to be slimmer, and also allows the reservoir (and thus the extension) to be reduced in size. Thus, there is a greater freedom of design of the frames accommodating the lenses.

The combination of powers can be such that the lens can have a negative power overall, even when the power of the cavity part of the lens is positive (ie when the flexible membrane curves outwards from the ring). This is advantageous, as it allows the pressure of the liquid in the cavity to remain at or above atmospheric pressure, and thus avoids the risk of outgassing of the liquid in the cavity, which would lead to bubbles in the lens.

In the earlier proposed lens, the flexible membrane 40 was attached to the front face of the ring 20, and the front cover 50 was then attached to the flexible membrane. Thus, the adhesive attaching the flexible membrane 40 to the ring 20 had to be strong enough to support the weight of the flexible membrane 40 and the front cover 50.

In addition, the flexible membrane 40 had to be such that adhesive would stick to both sides of it. Thus, it was either necessary to limit the range of materials from which the membrane could be made, or subject the membrane to a treatment on both sides to ensure that adhesive would stick to it. In practice, the membrane was usually formed from Mylar, which requires surface treatment before adhesive will stick to it.

Figure 2:
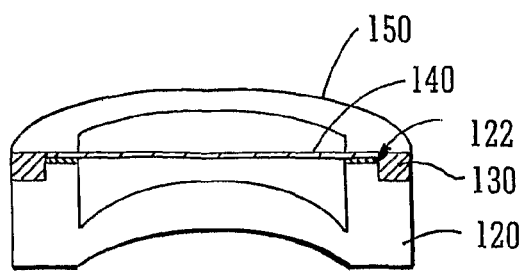
FIG. 2 is a cross-sectional view of an embodiment of a variable focus lens according to the present invention.

FIG. 2 shows a cross-section through an assembled lens according to an embodiment of the current invention, and FIGS. 3a to 3d show steps in its manufacture. Here, it will be noted that the rear cover and the ring are formed integrally (as a single part 120), but it will be appreciated that they can be formed separately and assembled in a separate step. Further, it will be seen that the rear cover and the front cover 150 are both formed as lenses.

Figure 3A:
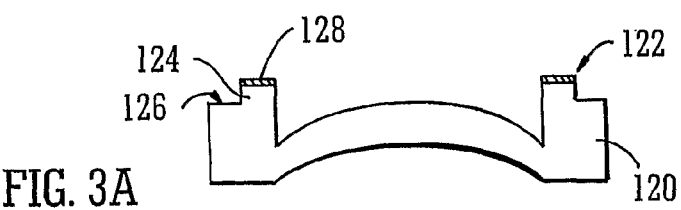
FIGS. 3a to 3d are a series of cross-sectional views, showing stages in the assembly of the lens of FIG. 2.
Figure 3B:
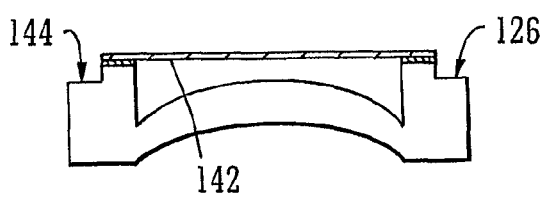
Figure 6A:
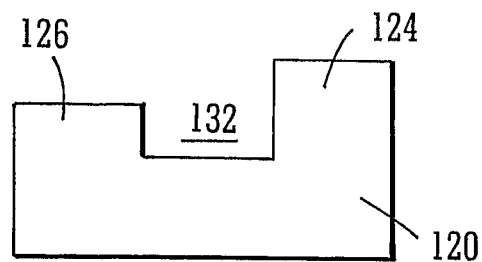
FIGS. 6a and 6b show alternative constructions of a part of the ring of the lens.

As best seen in FIG. 3a, the front surface 122 of the ring 120 is stepped, in that the radially inner part 124 (hereinafter referred to as the inner step) projects axially beyond the radially outer part 126 (hereinafter referred as the outer step). The flexible membrane 140 is bonded to the inner step 124, for example by means of adhesive 128, and the front cover 150 is bonded to the outer step 126, again for example by means of adhesive 130. It should be mentioned that the size of the inner step 124 is greatly exaggerated in the drawings for clarity purposes, and that in a real lens the inner step 124 projects axially by a fraction of a millimeter. It is also possible for a groove 132 to be provided between the radially inner part 124 and the radially outer part 126, as shown in FIG. 6a.

Figure 6B:
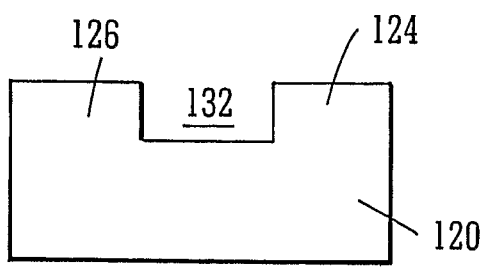

Indeed, as long as there is a radially inner part 124 to which the flexible membrane can be attached and a separate radially outer part 126 to which the front cover can be attached, there is no need for the inner part 124 to project beyond the outer part 126. However, it is still preferred for there to be a groove 132 between the radially inner part 124 and the radially outer part 126. Such an arrangement is shown in FIG. 6b.

As a first step in the construction of the lens, an adhesive 128 is applied to the inner step 124. In a preferred form, this adhesive is a UV cure acrylic monomer such as Loctite 3301, but it will be appreciated that any suitable adhesive can be used.

The flexible membrane 140 is then applied to the adhesive coating 128 on the inner step 124. The flexible membrane can be formed from any suitable material. In a preferred form, the membrane is formed from Mylar DL1, which has been pre-treated on the surface 142 which will be attached to the ring 120, to improve its adhesion characteristics.

Preferably, the flexible membrane 140 is pre-tensioned before it is attached to the ring 120, as this improves the optical characteristics of the lens. In a preferred form, a large sheet of the membrane is pre-tensioned and is then simultaneously attached to a number of rings. If this is done, then it is preferable for each region of membrane which is attached to a ring to be pre-tensioned separately, but it is also possible to tension the entire sheet.

If an individual membrane is attached to a ring 120 (rather than attaching several rings to the same membrane in a single step as discussed above), then it is preferred for the flexible membrane 140 to project radially beyond the inner step 124, to ensure that it is adhered to the entire surface of the inner step 124. If the flexible membrane 140 were exactly the same size as the inner step 124, then it would be necessary to align it extremely precisely during the attachment step; the preferred method avoids this requirement. The flexible membrane 140 may be cut roughly to size before attachment, and may project radially slightly beyond the inner step 124.

The adhesive is then allowed to cure (in the preferred form, it is exposed to UV light). After the adhesive is cured, the flexible membrane 140 is trimmed along the edge of the inner step 124, so that the outer step 126 is exposed (as shown by arrow 144 in FIG. 3b). The cutter can use the axial face of the inner step 124, or the groove 132 between the radially inner part 124 and the radially outer part 126, as a guide for this cutting. It is also possible to use a laser (in particular a $CO_2$ laser) to cut the membrane, and this may be preferable, as it avoids any problems such as tearing or snagging that can result from attempting to cut the membrane with a blade which has become blunt.

Figure 3C:
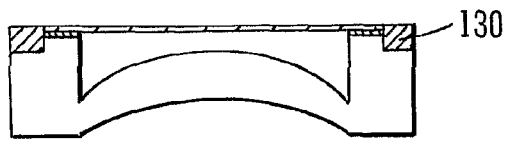

A layer of adhesive 130 is then applied to the outer step 126 (as shown in FIG. 3c). In the preferred form, this adhesive is again a UV cure acrylic monomer such as Loctite 3301, but it will be appreciated that any suitable adhesive can be used. Further, although the outer step 126 and thus the layer of adhesive is shown in the drawings as being comparatively deep 130, the reader is reminded that the step is in reality only a fraction of a millimeter in depth.

Lastly, the front cover 150 is positioned on the adhesive layer 130 in the outer step 126, and the adhesive is allowed to cure (for example, by being exposed to UV light again).

Figure 3D:
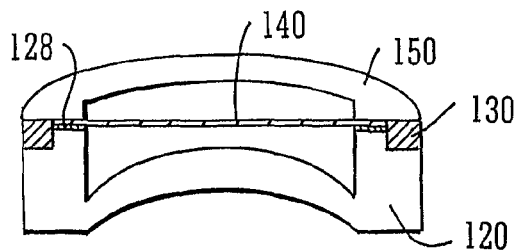

The completed assembly is shown in FIGS. 2 and 3d. As will be seen, the front cover 150 overlies the edge of the flexible membrane 140, and the spacings may be such that the edge of the membrane 140 is clamped between the ring 120 and the front cover 150. Alternatively, the parts of the lens can be arranged such that there is a gap between the edge of the flexible membrane 140 and the front cover 150.

Although the surfaces of the radially inner part 124 and the radially outer part 126 to which the membrane 140 and the front cover 150 are attached are shown as flat, this need not be the case. The surfaces could be concave, to accommodate the adhesive. Further, the radially inner part 124 can be formed with a further groove (or a projection) which engages with a corresponding projection (or groove) on the front cover 150. The groove would engage with the projection as the front cover 150 is assembled onto the lens, and this would stretch the flexible membrane 140 to further improve its optical properties. Other interengaging means for stretching the flexible membrane can of course be envisaged.

Although a method of assembly using adhesives has been described, it should be appreciated that other assembly methods can be used. For example, the membrane and the front cover could be connected to the ring by means of ultrasonic welding or similar. This could be done in a two-step method, similar to that discussed above; however, it would also be possible to weld the ring, membrane and cover together in a single step. Further, a method combining adhesives and ultrasonic welding is also possible, and it is also possible to use laser welding to assemble the lens.

Methods of assembling a lens corresponding to the method described with reference to FIGS. 2 and 3a to 3d but using laser welding will now be described with reference to FIGS. 4a to 4c, and methods using ultrasonic welding will be described with reference to FIGS. 5a and 5b.

Figure 4A:
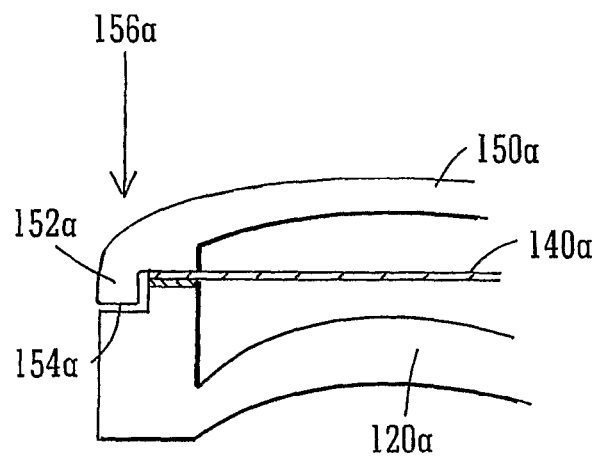
FIGS. 4a to 4c show methods of constructing a lens user laser welding.

The lens being assembled in FIG. 4a includes an integrally formed rear cover and ring, denoted by the reference numeral 120a. The front surface of the ring 120a is formed with a step, similar to ring 120. A flexible membrane 140a is attached to the inner step by means of adhesive, as described previously.

The front cover 150a is formed with an annular projection 152a, which fits into the outer step and surrounds the inner step. When the front cover 150a is assembled onto the ring 120a, the rear surface 154a of this annular projection 152a contacts the front face of the ring 120a, and the rear surface and the front face can be welded together by means of transmission laser welding, with the laser beam 156a being projected through the ring or the front cover. Laser welding is a quick process, and in particular can be advantageous as it does away with the curing time required when adhesives are used. Laser welds also tend to be of high quality.

As the ring and the front cover are both formed from transparent materials, it may be necessary to provide a melt zone by positioning an opaque material (such as carbon black) at the join, to absorb the laser radiation in sufficient quantities to allow the weld to be formed. However, as this opaque material will be visible in the finished lens through the transparent parts, it is preferable to use a material which is optically transparent but can absorb laser radiation outside the visible spectrum (eg an infra-red absorber such as Clearweld®).

Further, it may be possible to do away with the step of attaching the flexible membrane 140a to the ring 120a, and to simply clamp the entire assembly together prior to the laser welding step. In this case, it would be necessary to provide some means of preventing too much heat getting to the membrane, for example by shaping the surfaces of the ring 120a and the front cover 150a which contact the membrane 140a. Such a method has the obvious advantage of reduced manufacturing time.

As an aside, it should be noted that the specific shape of the front cover 150a, and in particular the annular projection 152a, can be advantageously employed in the two-step adhesive method described with reference to FIGS. 2 and 3a to 3d. The annular projection allows adhesive to spread around the geometry of the lens more easily, and provides a stronger joint with superior aesthetic features.

Figure 4B:
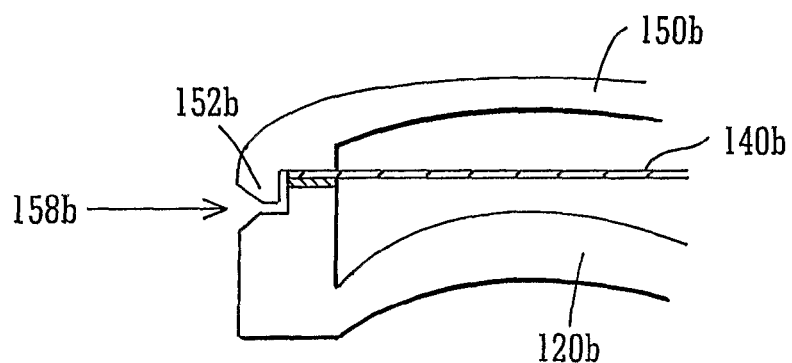
Figure 4C:
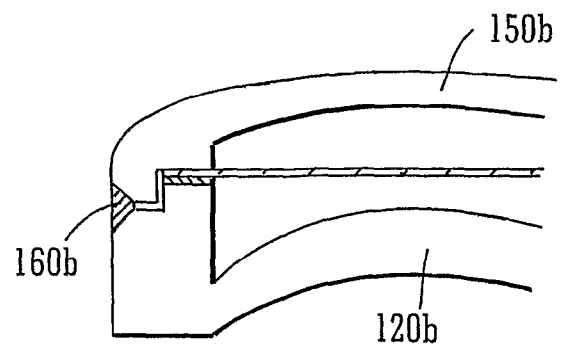

A second laser welding method is shown in FIGS. 4b and 4c. Here, the ring 120b and the front cover 150b are similar to ring 120a and front cover 150a shown in FIG. 4b, and in particular front cover 150b has an annular projection 152b. However, both the ring 120b and the front cover 150b are formed with a notch around their mating peripheries, which can be melted together using a laser 158b aimed from the side of the lens to form a weld 160b. The laser may be one whose radiation is absorbed by the lens materials (such as a $CO_2$ laser), or an absorber material may be used as mentioned above.

Again, the flexible membrane 140b can be adhered to the ring 120b prior to assembly of the front cover 150b, or the entire lens can be clamped together prior to the laser welding step.

Figure 5A:
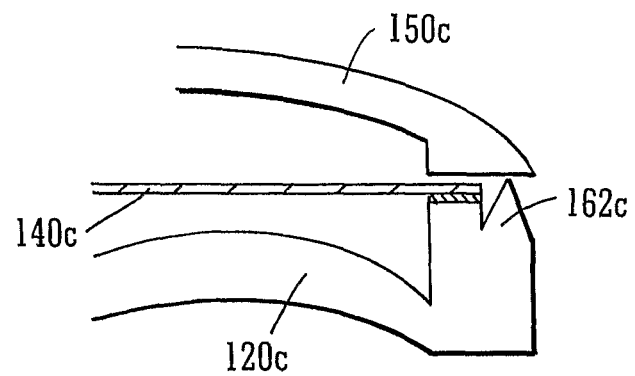
FIGS. 5a and 5b show methods of constructing a lens using ultrasonic welding.
Figure 5B:
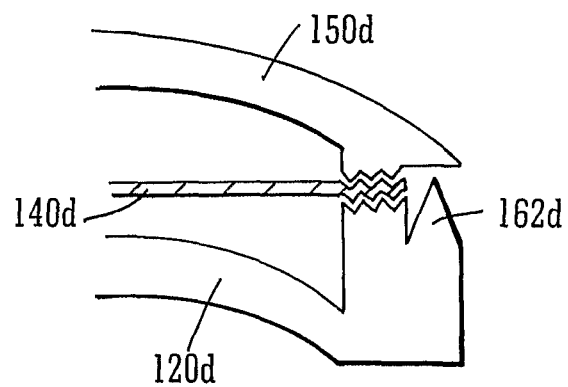

Joint geometries for use with ultrasonic welding are shown in FIGS. 5a and 5b. These can be very similar to those used for laser welding, except that an energy director must be provided on one of the parts to be welded together.

FIG. 5a shows a flexible membrane 140c attached to a ring 120c by means of adhesive. In the outer step of the ring is an energy director 162c, which projects towards the front of the lens. The point of the energy director comes into contact with the front cover 150c, allowing the front cover and the ring to be welded together using ultrasonic welding.

FIG. 5b shows an alternative arrangement, in which the flexible membrane 140d is not initially adhered to the ring 120d, but is instead clamped between the ring 120d and the front cover 150d. The surfaces of the ring 120d and the front cover 150d between which the membrane 140d are clamped are provided with projections which hold the membrane in place when the parts of the lens are clamped together, and in this case the ring 120d is provided with an energy director 162d. Thus, the lens can be produced using a single welding step. is required Like laser welding, ultrasonic welding is a quick process, and cleaner and quicker than using adhesives If the rear cover is formed as a separate member, rather than integrally with the ring as shown in FIG. 2, then it possible to interpose a second flexible membrane between the ring and the rear cover. If this is done, then the back face of the ring may also be stepped or otherwise divided into a radially inner part and a radially outer part, and the process of assembling of the second flexible membrane and the rear cover would be similar to that described above for the assembly of the flexible membrane and the front cover.

Although the above-described methods of attaching the flexible membrane and the front cover to the ring are currently preferred, alternative methods can be used.

For example, the ring can be formed in a similar manner to that shown in FIG. 2, but with the radially outer part projecting above the radially inner part so as to form a recess. The flexible membrane is attached to the radially inner part within this recess. The front cover is also accommodated within the recess, and is bonded to the ring at its edge (either by adhesive or welding).

A further possible method of attaching the front cover to the ring involves forming the ring with an annular chamber beneath the radially outer part, with a number of ports formed between the annular chamber and the radially outer part. After the front cover is brought into contact with the radially outer part, an adhesive is injected into the annular chamber, and the adhesive flows through the chamber and the ports to come into contact with the front cover and thus attach it to the ring.

Once the lens has been assembled, it needs to be filled with liquid. It is preferred to use silicone oil, but any suitable liquid may be used.

It will be appreciated that it is extremely important to prevent the presence of any air bubbles in the filled lens. A currently preferred method of filling the lens is shown in FIGS. 7a to 7h. In contrast to the lens shown in FIG. 1, the extension here does not project along a radius of the lens, but is instead offset.

Figure 7A:
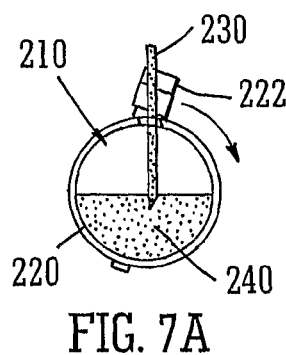
FIGS. 7a to 7h are a series of views showing the process of filling a lens with an integral extension.

In a first step of the filling process, the lens 210 is positioned on its edge, with its optical axis horizontal, and with the extension 222 pointing generally upwards (as seen in FIG. 7a). Specifically, the lens 210 is positioned so that the hole in the wall of the ring 220 which communicates with the bore in the extension 222 is positioned at the top of the ring 220. Further, the extension 222 is angled such that a suitably sized and shaped needle 230 can be inserted vertically into the lens cavity through the bore in the extension 222. A gap should be left between the outside of the needle 230 and the inside of the bore, to allow displaced air to escape.

Figure 7B:
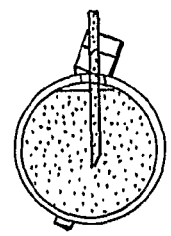

Liquid 240 is then introduced through the needle 230 into the cavity of the lens 210. The liquid 240 is introduced in a controlled manner to avoid turbulent flow and the generation of bubbles. FIG. 7b shows the situation near the end of this step, when the cavity is almost full of liquid. As can be seen, arranging the lens 210 so that the hole in the wall of the ring 220 is at the top of the ring ensures that the last air in the cavity is resting under the reservoir, and can be displaced and escape as more liquid is introduced into the lens.

Figure 7C:
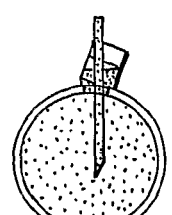
Figure 7D:
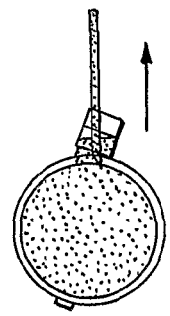
Figure 7E:
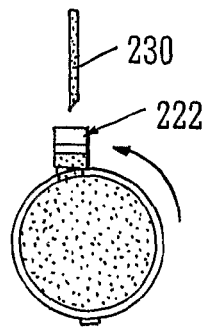
Figure 7F:
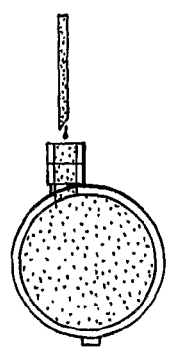

Liquid continues to be introduced into the lens, and starts to fill the reservoir (see FIG. 7c). As the reservoir fills, the needle 230 is withdrawn (see FIG. 7d), and the lens is rotated to bring the axis of the bore into a vertical position (see FIG. 7e).

Further liquid is then added to the reservoir, whose brim is now horizontal. Liquid is added until there is a positive meniscus at the brim of the reservoir (see FIG. 7f, although the meniscus is not shown).

Figure 7G:
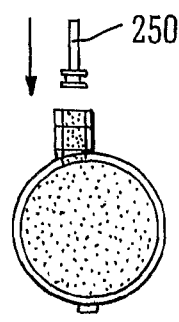
Figure 7H:
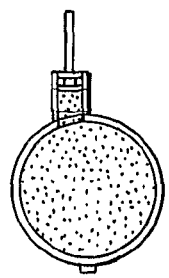

A piston 250 is then inserted into the reservoir (see FIGS. 7g and 7h). Contact between the meniscus and the piston head prevents air from entering the lens 210 via the reservoir as the piston 250 is inserted.

In a preferred form, some sort of closed loop system for automatically controlling fluid flow and lens orientation is provided. (Automated systems for dispensing viscous fluids are known per se; see for example US 2007/0069041.) The filling apparatus includes a jig for holding and rotating the lens as necessary, a bulk filling stage for inserting most of the liquid into the lens cavity via a needle, a fine filling stage for trickling the last of the liquid into the reservoir, and an optical feedback control system on the fine filling stage which detects when a meniscus is formed at the brim of the reservoir and ends the fine filling.

The piston 250 is part of the adjustment mechanism, and can be moved into and out of the reservoir to force liquid into the lens cavity, or suck liquid from the lens cavity, to vary the power of the lens.

Figure 8:
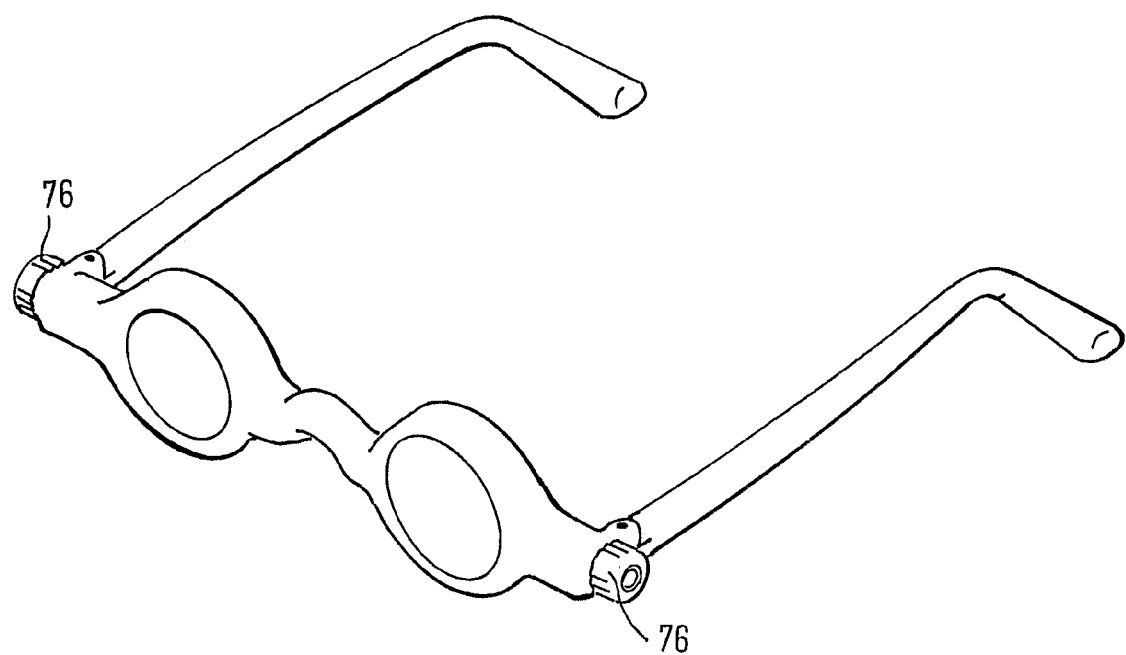
FIG. 8 is a perspective view of a pair of spectacles.

It will be appreciated that the piston can be moved in a great many ways. However, it has been found that wearers of the spectacles tend to be most comfortable with an adjustment process that involves rotating a knob 76 whose axis is horizontal and generally in the plane of the lenses (see FIG. 8).

In its most basic form, the adjustment mechanism comprises a piston arranged to move along the axis of the reservoir, to move liquid into or out of the cavity, means for holding the piston centrally in the reservoir, and preventing it from being withdrawn, and an adjuster means coupled to the piston, such that rotation of the adjuster means causes the piston to move along the axis of the reservoir. The adjustment mechanism can also include a further cosmetic member, coupled to the adjuster means to improve its appearance.

Figure 9A:
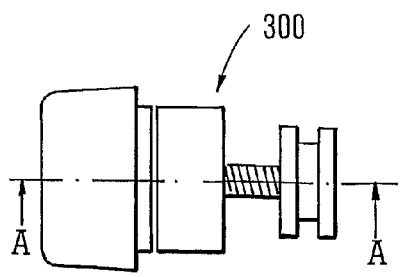
FIGS. 9a to 9m are a series of views showing the assembled adjustment mechanism and the various parts thereof.
Figure 9B:
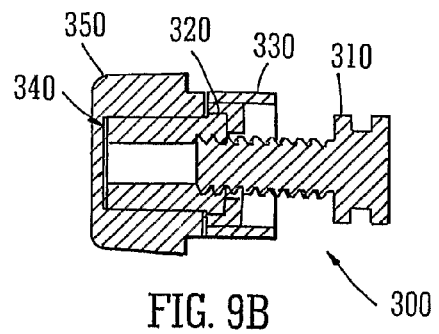
Figure 9C:
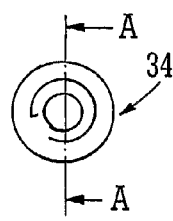
Figure 9D:
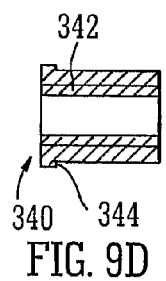

A presently preferred form of the adjustment mechanism will now be described with reference to FIGS. 9a to 9m. FIG. 9a is a side view of the adjustment mechanism 300, and FIG. 9b is a cross-sectional view of the adjustment mechanism 300. In these two Figures, the adjustment mechanism is removed from the extension on the lens, and it will be appreciated that in use, the piston will be positioned within the reservoir. (FIG. 9m is another view of the adjustment mechanism 300, with the extension on the lens shown in dotted lines, to clarify how the various parts of the adjustment mechanism interact with the extension.) FIGS. 9c to 9l are end views and cross-sectional views, respectively, of the various components of the adjustment mechanism.

Figure 9E:
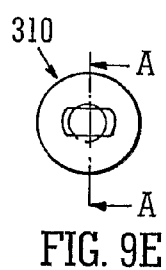
Figure 9F:
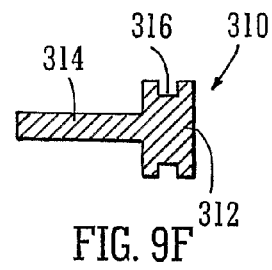

The piston 310 is shown in FIGS. 9e and 9f, and comprises a piston head 312 mounted at the end of a shaft 314. The piston head 312 contacts the fluid, and is provided with a circumferential groove 316 to accommodate a seal such as an O-ring, which seals against the sides of the reservoir. Of course, other forms of seal can also be used.

The shaft itself 314 is threaded, and as can be seen from FIGS. 9b and 9e, is of rectangular cross-section. (The shape of the shaft can be visualized as a normal threaded cylinder which has had its sides removed.)

Figure 9G:
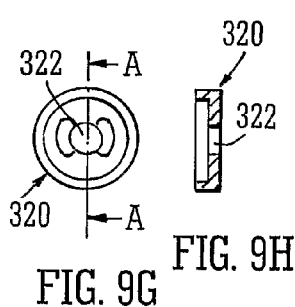
Figure 9H:
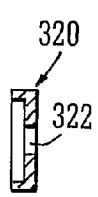
Figure 9I:
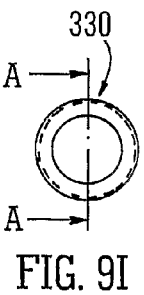
Figure 9J:
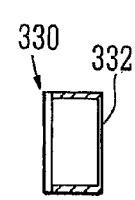
Figure 9K:
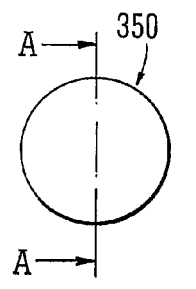
Figure 9L:
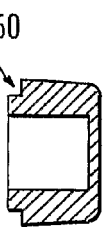
Figure 9M:
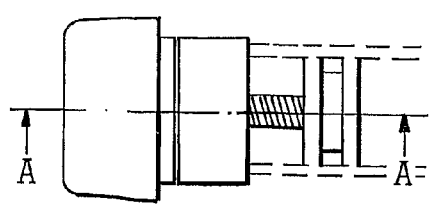

The shaft 314 of the piston 310 passes through a rectangular slot 322 in a keyway 320, shown in FIGS. 9g and 9h. The keyway 320 is fixed relative to the extension, and cannot rotate under normal circumstances. Because of the rectangular shape of the slot 322 and the piston shaft 314, the piston is thus also prevented from rotating. The keyway 320 also serves as a stop to prevent the piston 310 from being withdrawn too far from the extension.

It is possible to do without the keyway 320, and simply provide a stop to prevent the piston 310 from being withdrawn. However, this is not preferred, as the piston 310 is then able to rotate in the reservoir, and this can damage the seal between the piston and the reservoir.

In the arrangement shown, the keyway is clamped against the end of the extension by a retainer 330 (shown in FIGS. 9i and 9j), which is screwed onto the end of the extension. (Clearly, this will require the extension to be formed with a cylindrical exterior, unlike the version shown in FIG. 1.) The retainer 330 is in the form of a cap with a circular opening 332 in its main face, and the piston shaft 314 projects through this opening.

The opening 332 in the main face of the retainer 330 also accommodates an adjuster 340, which is in the form of a tubular member with an internal screw thread 342. The internal screw thread 342 engages with the screw thread formed on the outside of the piston shaft 314 (as best shown in FIG. 9b). The external diameter of the body of the adjuster 340 is slightly less than the internal diameter of the circular opening 332 in the retainer 330, so that the adjuster 340 can rotate relative to the retainer 330. Further, the adjuster has a projecting lip 344, whose external diameter is slightly greater than the internal diameter of the circular opening 332 in the retainer 330. Thus, the lip 344 engages behind the retainer 330, and holds the adjuster 340 in place.

The adjuster 340 is held axially against the keyway 320 by the engagement of the lip 344 behind the retainer 330; however, it is free to rotate. Meanwhile, the piston 310 is free to move axially within the reservoir, but is prevented from rotating by the keyway 320. Thus, rotation of the adjuster 340 serves to screw the piston shaft 314 into or out of the threaded bore 342 of the adjuster 340, and thus move the piston 310 along the reservoir to move liquid into or out of the cavity.

It is also possible to attach a further knob 350 to the adjuster 340 (as shown in the drawings). This may be done, for example, to improve the cosmetic appearance of the assembly. Of course, if the adjuster 340 itself is of acceptable appearance, then the cosmetic knob 350 can be omitted.

In its simplest form, the cosmetic knob 350 is directly connected to the adjuster 340 (for example by adhesive, or by splines formed on the outside of the adjuster and the inside of the cosmetic knob), so that they rotate as one.

However, it is preferred for there to be some form of clutch mechanism disposed between the adjuster 340 and the cosmetic knob 350. Such a clutch mechanism can be advantageous in situations where the adjustment mechanism could be damaged by overtightening or the like.

In a simple form, the clutch may be formed as an integral part of one or both of the adjuster 340 and the cosmetic knob 350. For example, the adjuster 340 can have external splines, and the cosmetic knob 350 can be formed with inwardly-projecting fingers, which have a degree of flexibility. Rotation of the cosmetic knob 350 causes the fingers to push on the splines, and this normally rotates the adjuster 340. However, if the piston 310 has reached the end of its travel, and thus further rotation of the adjuster 340 is prevented, then the fingers will deform and ride over the splines, preventing the mechanism from being damaged. Of course, other forms of slipping mechanisms such as friction plates could also be used.

In a more complex form, a separate clutch member can be disposed between the adjuster 340 and the cosmetic knob 350. As above, this separate clutch could use elastic deformation of a part to prevent excessive force transmission, or slipping mechanisms such as friction plates or a ball bearing urged into a socket by a spring.

It is possible to provide some form of ratchet arrangement in the adjustment mechanism, which produces an audible click or tactile sensation at preset adjustment intervals. For example, the ratchet may be arranged to click for each change in power of a quarter of a dioptre.

Although the adjustment mechanism shown in FIGS. 9a and 9b has the cosmetic knob 350 attached, in practice the cosmetic knob 350 is not attached to the mechanism until after the lens has been fitted into the frame. Insertion of a lens into the frame is shown in FIGS. 10a to 10d.

Figure 10A:
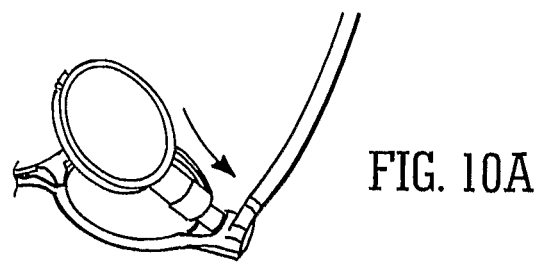
FIGS. 10a to 10d illustrate the steps of installing a lens in a spectacle frame.
Figure 10B:
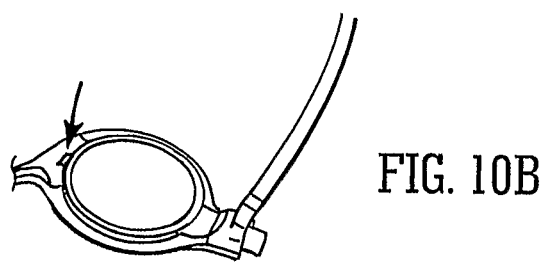

As can be seen from FIGS. 10a and 10b in particular, the frame is formed with a recess to accommodate the lens, and a through-hole for the extension. As shown by the arrow in FIG. 10a, the extension is fed through the through-hole, and then (as shown in FIG. 10b) the lens is pushed into the recess. A lug is provided on the lens, opposite the recess, and the lug snaps into a recess in the frame to hold the lens in place.

Figure 10C:
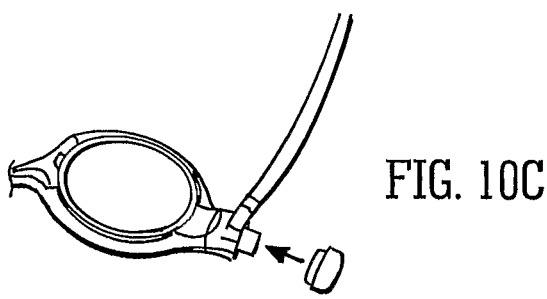
Figure 10D:
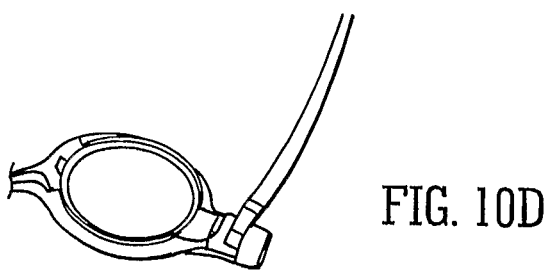

Once the lens is secured in place, the cosmetic knob is fitted onto the adjuster, as shown in FIG. 10c, and the complete assembly of frame, lens and knob is shown in FIG. 10d.

Figure 11A:
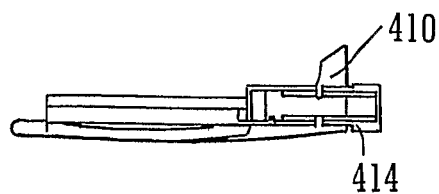
FIGS. 11a to 11c illustrate a different method of installing a lens in a spectacle frame.
Figure 11B:
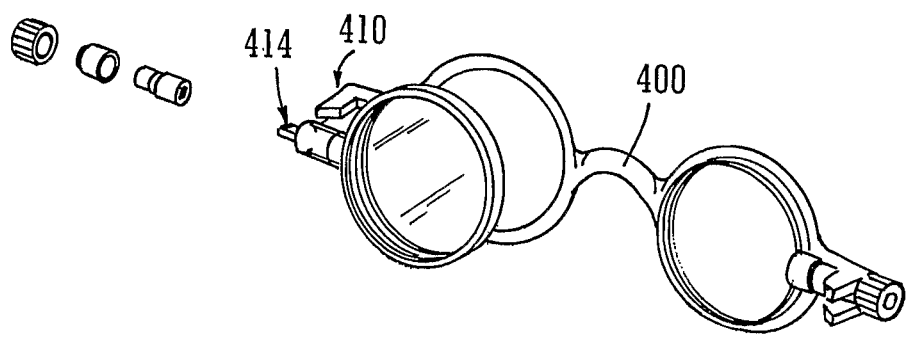
Figure 11C:
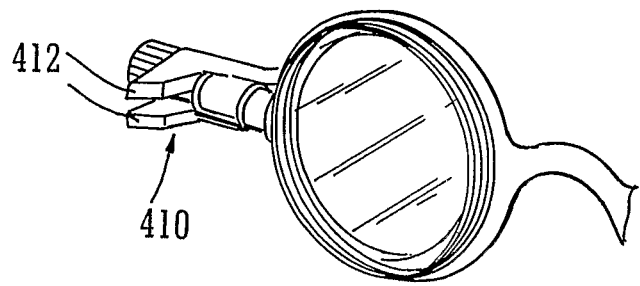

An alternative way of mounting the lenses in a frame is shown in FIGS. 11a to 11c. The adjustment mechanism of this arrangement is slightly different from that of the previous embodiments, as no separate keyway member is provided. Instead, a part 410 of the frame 400 serves as the keyway, to prevent rotation of the piston shaft.

As best shown in FIGS. 11b and 11c, the frame is provided with two rearwardly-projecting members 412 at each side. A slot is defined between these members, and the piston shaft 414 engages in this slot. The adjustment mechanism is not fully assembled before the lens is mounted to the frame; indeed, the lens is mounted after the piston is inserted into the reservoir but before any other parts of the adjuster are assembled.

The remaining parts of the adjustment mechanism are then assembled around the frame. The adjuster is screwed onto the piston shaft, and the retainer is fitted over the adjuster to hold it in place. As can seen from FIGS. 11a and 11b, the retainer is fitted into the frame. The cosmetic knob is fitted on, and then the side arm is attached to the frame.

It is possible to mould the ring with various sacrificial structures, which assist the manufacturing process but are removed before the lens is assembled into the frame. For example, the ring be moulded with structures allowing it to be held and rotated more easily during the filling process; these can be removed from the ring (for example, by machining) after the lens is filled, as they are no longer needed at that point.

Further, although only some specific arrangements of the extension have been shown in the Figures, it should be appreciated that the extension can take any suitable form. In particular, it can be attached to the ring such that its major axis approaches the ring at any desired angle. Further, the cross-sectional shape of the extension can be any desired shape, and the piston head and the retainer can be made to fit this shape.

Figure 12:
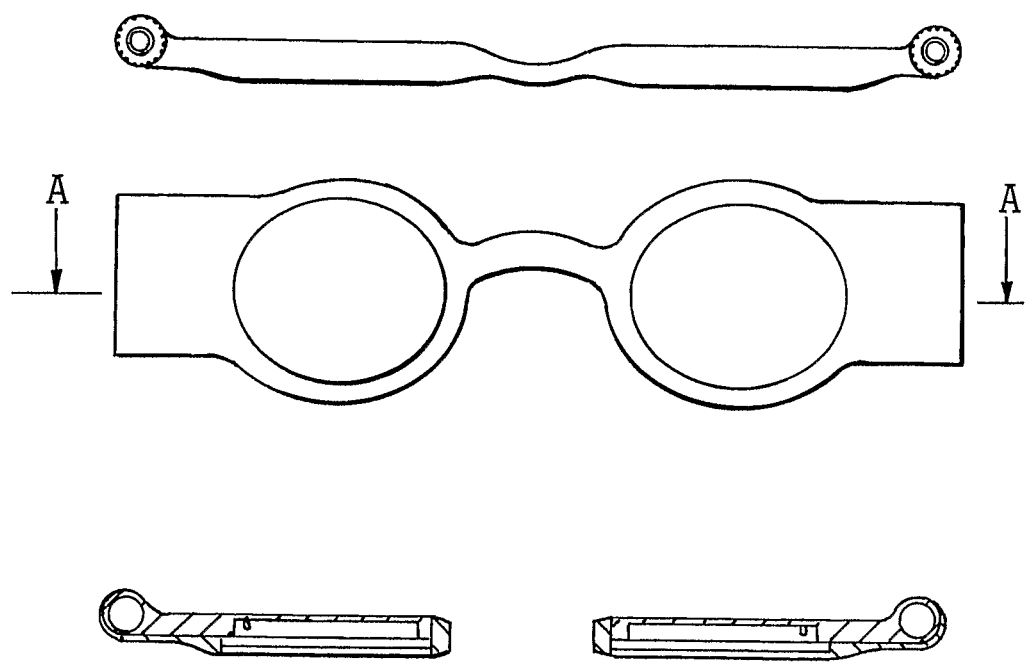
FIG. 12 is a view of spectacle frames with vertical adjusters.

In a further alternative form, the adjustment mechanism can be positioned vertically rather than horizontally. FIG. 12 is a view of spectacle frames with such vertical adjusters.

The invention claimed is:

1. A variable focus lens, comprising:
a ring with a front surface and a rear surface, wherein the front surface has a radially inner part and a radially outer part;
a flexible membrane attached to the radially inner part of the front surface;
a front cover, of larger radius than the flexible membrane, attached to the radially outer part of the front surface; and
a rear cover on the rear surface of the ring, such that a variable volume cavity is defined between the flexible membrane, the ring and the rear cover.

2. A variable focus lens as claimed in claim 1, wherein the radially inner part projects axially beyond the radially outer part, thus forming a step in an outer profile of the ring.

3. A variable focus lens as claimed in claim 2, wherein the front cover is formed with an annular projection that fits into a step of the profile of the ring.

4. A variable focus lens as claimed in claim 1, wherein the radially inner part and the radially outer part are separated by a groove.

5. A variable focus lens as claimed in claim 1, wherein the front cover is attached to the ring by laser welding.

6. A variable focus lens as claimed in claim 1, wherein the front cover is attached to the ring by ultrasonic welding.

7. A variable focus lens, comprising:
a ring with a front surface and a rear surface, wherein the front surface and the rear surface both have a radially inner part and a radially outer part;
a first flexible membrane attached to the radially inner part of the front surface;
a front cover, of larger radius than the first flexible membrane, attached to the radially outer part of the front surface;
a second flexible membrane attached to the radially inner part of the rear surface; and
a rear cover, of larger radius than the second flexible membrane, attached to the radially outer part of the rear surface, such that a variable volume cavity is defined between the flexible membranes and the ring.

8. A method of filling a variable volume cavity of a variable focus lens with liquid, wherein the lens includes an integral hollow extension with an internal cavity that communicates with the variable volume cavity via an opening in a side wall of the variable volume cavity; comprising the steps of:
arranging the lens such that an optical axis is horizontal, and the opening in the side wall of the variable volume cavity is at a top of the lens;
introducing liquid into the variable volume cavity through the internal cavity of the integral extension such that air in the cavity is displaced and escapes through the internal cavity of the integral extension;
continuing the previous step until the variable volume cavity is entirely filled with liquid, and the internal cavity of the integral extension is partly filled with liquid;
rotating the lens around the optical axis until an axis of the internal cavity of the integral extension is vertical;
introducing more liquid into the internal cavity of the integral extension until a positive meniscus is formed at a mouth of the internal cavity; and
inserting a piston into the internal cavity of the integral extension to seal the cavity.

9. A variable focus lens comprising a ring with a front surface and a rear surface, a flexible membrane and a front cover attached to the front surface, and a rear cover on the rear surface of the ring, such that a variable volume cavity is defined between the flexible membrane, the ring and the rear cover,
wherein the ring is provided with a integral hollow extension, a hollow interior of said extension communicating with said cavity, and forming a liquid reservoir for the variable focus lens when the variable volume cavity is filled with liquid;
the lens being further provided with an adjustment mechanism on the integral hollow extension, the adjustment mechanism comprising:
a piston arranged to move along an axis of the reservoir, to move liquid into or out of the variable volume cavity;
means for holding the piston in the reservoir and preventing the piston from being withdrawn; and
an adjuster coupled to the piston, such that rotation of the adjuster causes the piston to move along the axis of the reservoir.

10. A variable focus lens as claimed in claim 9, wherein means are provided to prevent the piston from rotating in the reservoir.

11. A variable focus lens as claimed in claim 9, wherein the piston has a shaft with a non-circular cross-section, and said adjustment mechanism additionally comprises a keyway to prevent the piston from rotating in the reservoir.

12. A variable focus lens as claimed in claim 9, wherein the piston shaft comprises an external screw thread which engages in a bore in the adjuster with an internal screw thread.

13. A variable focus lens as claimed in claim 11, wherein a retainer serves to hold the keyway and the adjuster in place on the extension.

14. A variable focus lens as claimed in claim 9, wherein a cosmetic knob is provided on said adjuster to improve its appearance.

15. A variable focus lens as claimed in claim 14, wherein a clutch mechanism is disposed between the adjuster and the knob, to prevent damage to the mechanism from overtightening.

* * * * *